US008718361B2

(12) United States Patent
Moon et al.

(10) Patent No.: US 8,718,361 B2
(45) Date of Patent: May 6, 2014

(54) APPARATUS, METHOD AND COMPUTER-READABLE MEDIUM REMOVING NOISE OF COLOR IMAGE

(75) Inventors: Young Su Moon, Seoul (KR); Joon Hyuk Cha, Incheon (KR); Shi Hwa Lee, Seoul (KR); Young Sun Jeon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 707 days.

(21) Appl. No.: 12/904,793

(22) Filed: Oct. 14, 2010

(65) Prior Publication Data

US 2011/0194763 A1 Aug. 11, 2011

(30) Foreign Application Priority Data

Feb. 5, 2010 (KR) ........................ 10-2010-0010787

(51) Int. Cl.
*G06K 9/00* (2006.01)
*H04N 5/217* (2011.01)
(52) U.S. Cl.
USPC ......................................... 382/167; 348/241
(58) Field of Classification Search
None
See application file for complete search history.

(56) References Cited

U.S. PATENT DOCUMENTS

| | | | | |
|---|---|---|---|---|
| 5,467,145 A * | 11/1995 | Limberg | | 348/628 |
| 5,606,375 A * | 2/1997 | Lee | | 348/606 |
| 6,687,414 B1 * | 2/2004 | Edgar | | 382/275 |
| 6,771,833 B1 * | 8/2004 | Edgar | | 382/254 |
| 6,975,354 B2 * | 12/2005 | Glotzbach et al. | | 348/273 |
| 8,068,163 B2 * | 11/2011 | Johnson et al. | | 348/340 |
| 2005/0249404 A1 * | 11/2005 | Xiaomang | | 382/162 |
| 2006/0012808 A1 | 1/2006 | Mizukura et al. | | |
| 2006/0072814 A1 * | 4/2006 | Messina et al. | | 382/162 |
| 2006/0093234 A1 * | 5/2006 | Silverstein | | 382/255 |
| 2007/0216785 A1 * | 9/2007 | Nomura et al. | | 348/242 |
| 2008/0144930 A1 * | 6/2008 | Kien et al. | | 382/167 |
| 2008/0247662 A1 * | 10/2008 | Yasuma et al. | | 382/264 |
| 2009/0060323 A1 | 3/2009 | Aragaki et al. | | |
| 2009/0161019 A1 * | 6/2009 | Jang | | 348/663 |
| 2009/0167902 A1 * | 7/2009 | Wang et al. | | 348/241 |
| 2010/0066874 A1 * | 3/2010 | Ishiga | | 348/252 |
| 2010/0091147 A1 * | 4/2010 | Nomura et al. | | 348/279 |
| 2010/0097495 A1 * | 4/2010 | Choe et al. | | 348/235 |
| 2010/0220223 A1 * | 9/2010 | Tsuruoka | | 348/242 |
| 2011/0064327 A1 * | 3/2011 | Dagher et al. | | 382/263 |

FOREIGN PATENT DOCUMENTS

| | | |
|---|---|---|
| JP | 9-50519 | 2/1997 |
| JP | 2002-269558 | 9/2002 |
| JP | 2008-172431 | 7/2008 |
| JP | 2009-77393 | 4/2009 |
| KR | 10-2004-0044556 | 5/2004 |
| KR | 10-2006-0133773 | 12/2006 |
| KR | 10-2009-0067911 | 6/2009 |

\* cited by examiner

*Primary Examiner* — Wenpeng Chen
(74) *Attorney, Agent, or Firm* — Staas & Halsey LLP

(57) ABSTRACT

Provided is an apparatus, method and computer-readable medium removing noise of an image. The apparatus may include a channel image correction unit to correct remaining channel images excluding a currently processed channel image, from among a plurality of channel images, using the currently processed channel image, a noise removal unit to remove noise of the currently processed channel image, using the corrected remaining channel images and the currently processed channel image, and a color image reconstruction unit to reconstruct a color image in which noise is removed, by combining the plurality of channel images in which noise is removed when the noise of the plurality of channel images is removed.

12 Claims, 11 Drawing Sheets

APPARATUS, METHOD AND COMPUTER-READABLE MEDIUM REMOVING NOISE OF COLOR IMAGE

CROSS-REFERENCE TO RELATED APPLICATIONS

This application claims the benefit of Korean Patent Application No. 10-2010-0010787, filed on Feb. 5, 2010, in the Korean Intellectual Property Office, the disclosure of which is incorporated herein by reference.

BACKGROUND

1. Field

Example embodiments relate to an apparatus, method, and computer-readable medium removing noise of an image, and more particularly, to an apparatus, method and computer-readable medium removing noise of an image, which may remove noise of a color image using a plurality of channel images.

2. Description of the Related Art

To prevent a blurry photograph from occurring due to shaky hands in a relatively dark environment where longer camera exposure may be needed, a photograph may be taken using a high camera ISO sensitivity setting. In this case, strong noise having various characteristics may be generated causing adverse effects in obtaining a high quality image with a camera, and in obtaining a satisfactory performance when implementing various high functions based on images. As for existing technology used for removing noise from a color image, noise removal performance may be improved when there is an increase in a number of similar patterns within neighboring pixels. However, when similar patterns do not exist within the neighboring pixels, the details of corresponding image pixels are blurred.

SUMMARY

The foregoing and/or other aspects are achieved by providing an apparatus removing noise of an image, including: a channel image correction unit to correct remaining channel images excluding a currently processed channel image from among a plurality of channel images using the currently processed channel image, a noise removal unit to remove noise of the currently processed channel image, using the corrected remaining channel images and the currently processed channel image, and a color image reconstruction unit to reconstruct a color image in which noise is removed, by combining the plurality of channel images in which noise is removed when the noise of the plurality of channel images is removed.

The channel image correction unit may correct the remaining channel images to replace an image corresponding to a low frequency band from among the remaining channel images with an image corresponding to a low frequency band from among the currently processed channel images.

The apparatus may further include a frequency band separation unit to separate each of the plurality of channel images to a low frequency band image and a high frequency band image to generate a plurality of Laplacian pyramids corresponding to the plurality of channel images, wherein the channel image correction unit corrects low frequency bands of the plurality of Laplacian pyramids corresponding to the remaining channel images to output the corrected plurality of Laplacian pyramids.

The channel image correction unit may correct a part or all of the low frequency bands of the plurality of Laplacian pyramids.

The apparatus may further include a channel image restoration unit to restore, into the plurality of channel images, the corrected plurality of Laplacian pyramids corresponding to the remaining channel images.

The noise removal unit may set, in the currently processed channel image and the corrected remaining channel images, a search region where a pattern matching is performed, with respect to a current pixel in which noise is removed, and remove the noise of the current pixel using a cumulative result of intensity where a weight is applied to neighboring pixels of the current pixel and a cumulative result of the weight.

The noise removal unit may divide the cumulative result of the intensity into the cumulative result of the weight to remove the noise of the current pixel.

The apparatus may further include a color image division unit to divide an inputted color image into the plurality of channel images.

The foregoing and/or other aspects are achieved by providing a method of removing noise of an image, including: correcting, by at least one processor, remaining channel images excluding a currently processed channel image from among a plurality of channel images using the currently processed channel image, removing, by the at least one processor, noise of the currently processed channel image, using the corrected remaining channel images and the currently processed channel image, and reconstructing, by the at least one processor, a color image in which noise is removed, by combining the plurality of channel images in which noise is removed when the noise of the plurality of channel images is removed.

The correcting may correct the remaining channel images to replace an image corresponding to a low frequency band from among the remaining channel images with an image corresponding to a low frequency band from among the currently processed channel images.

The method may further include generating a plurality of Laplacian pyramids corresponding to the plurality of channel images by separating each of the plurality of channel images to a low frequency band image and a high frequency band image, wherein the correcting corrects low frequency bands of the plurality of Laplacian pyramids corresponding to the remaining channel images to output the corrected plurality of Laplacian pyramids.

The correcting may correct a part or all of the low frequency bands of the plurality of Laplacian pyramids.

The method may further include restoring, into the plurality of channel images, the corrected plurality of Laplacian pyramids corresponding to the remaining channel images.

The removing may set, in the currently processed channel and the corrected remaining channel images, a search region where a pattern matching is performed, with respect to a current pixel in which noise is removed, and remove the noise of the current pixel using a cumulative result of intensity where a weight is applied to neighboring pixels of the current pixel and a cumulative result of the weight.

The method may further include dividing an inputted color image into the plurality of channel images.

The foregoing and/or other aspects are achieved by providing at least one non-transitory computer readable medium including computer readable instructions that control at least one processor to implement methods of one or more embodiments.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
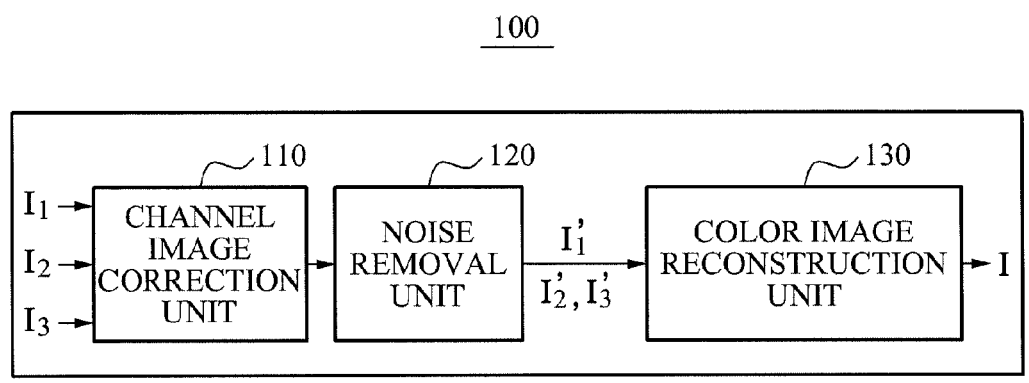
FIG. 1 is a diagram illustrating an example of an apparatus removing noise of an image according to example embodiments.

Reference will now be made in detail to the embodiments, examples of which are illustrated in the accompanying drawings, wherein like reference numerals refer to like elements throughout. The embodiments are described below to explain the present disclosure by referring to the figures.

FIG. 1 is a diagram illustrating an example of an apparatus 100 removing noise of an image.

The apparatus 100 may be a device removing noise of an inputted color image when providing the color image to a user, and may be applied to electronic equipment related to image processing.

Referring to FIG. 1, the apparatus 100 includes a channel image correction unit 110, a noise removal unit 120, and a color image reconstruction unit 130.

The channel image correction unit 110 may correct remaining channel images excluding a currently processed channel image, from among a plurality of inputted channel images $I_1$, $I_2$, and $I_3$, using the currently processed channel image. The plurality of channel images $I_1$, $I_2$, and $I_3$ may be sequentially processed or simultaneously processed. In a case where the plurality of channel images $I_1$, $I_2$, and $I_3$ are sequentially processed, when the currently processed channel image is a channel image $I_1$, the remaining channel images may be channel images $I_2$ and $I_3$.

The noise removal unit 120 may remove noise of the currently processed channel image using the corrected remaining channel images $I_{2C}$ and $I_{3C}$ and the currently processed channel image $I_1$. When noise of the currently processed channel image $I_1$ is removed, the noise removal unit 120 may remove noise of the channel image $I_2$ using the corrected remaining channel images $I_{1C}$ and $I_{3C}$ and the currently processed channel image $I_2$. The same operations may be applied to the channel image $I_3$ in the same manner.

When noise of the plurality of channel images is removed, the color image reconstruction unit 130 may reconstruct a color image (I) in which noise is removed, by combining the plurality of channel images $I_1'$, $I_2'$, and $I_3'$ in which noise is removed.

Figure 2:
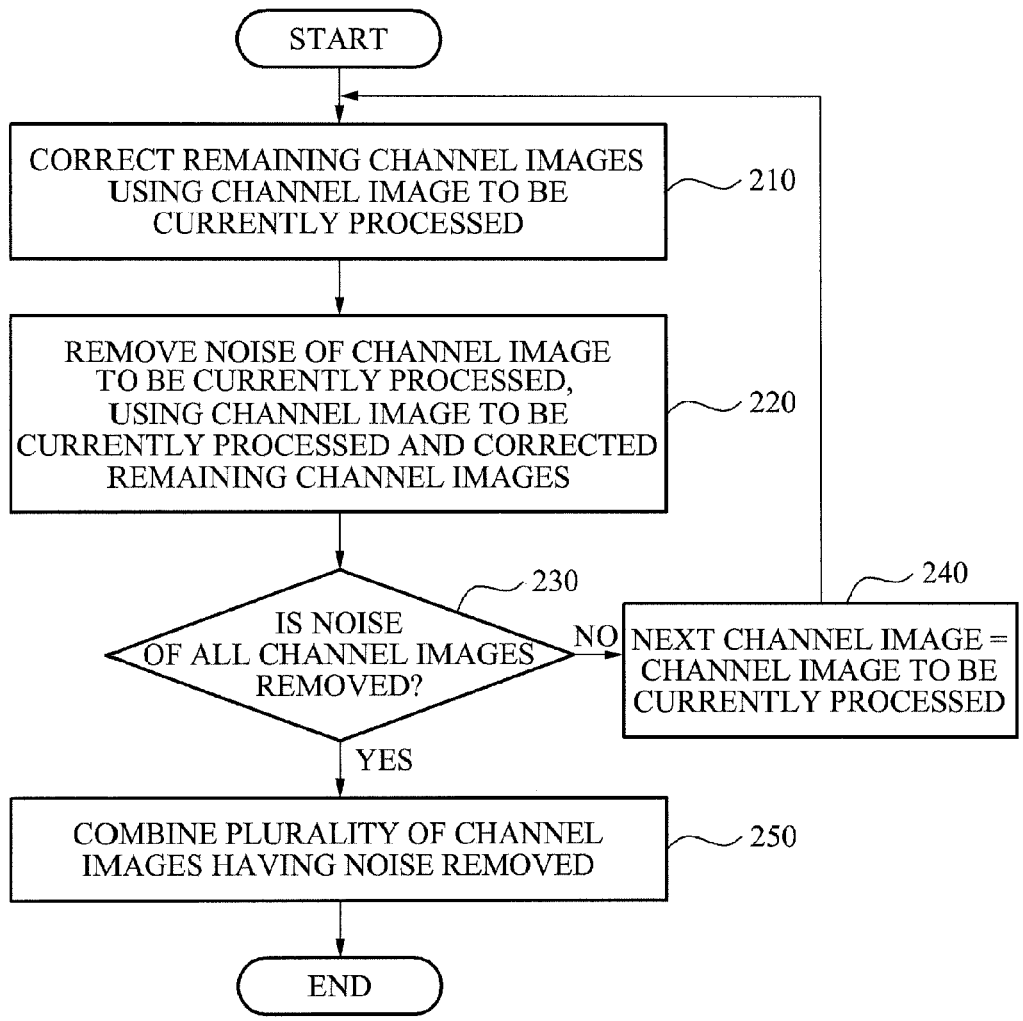
FIG. 2 is a flowchart illustrating a method of removing noise of an image according to example embodiments.

FIG. 2 is a flowchart illustrating a method of removing noise of an image.

In operation 210, remaining channel images $I_1$, $I_2$, and $I_3$ excluding a currently processed channel image from among a plurality of inputted channel images may be corrected using the currently processed image in the image channel correction unit 110. When the currently processed channel image is the channel image $I_1$, the remaining channel images may be the channel images $I_2$ and $I_3$.

In operation 220, using the corrected remaining channel images $I_{2C}$ and $I_{3C}$ and the currently processed channel image noise of the currently processed channel image $I_1$ may be removed in the noise removal unit 120.

In operation 240, when the currently processed channel image where a noise is removed is determined to remain in the plurality of channel images $I_1$, $I_2$, and $I_3$ in operation 230, a next channel image may be determined as the currently processed channel image, and operations 210 to 230 may be repeatedly performed.

Conversely, when noise of all of the plurality of channel images $I_1$, $I_2$, and $I_3$ is determined to be removed in operation 230, a color image (I) in which noise is removed may be reconstructed in the color image reconstruction unit 130 by a combination of the plurality of channel images $I_1'$, $I_2'$, and $I_3'$ in which noise is removed.

As described above, when removing noise of the currently processed channel image in which noise is currently removed, noise may be removed using remaining channel images excluding the currently processed channel image, thereby improving a noise removal performance.

Figure 3:
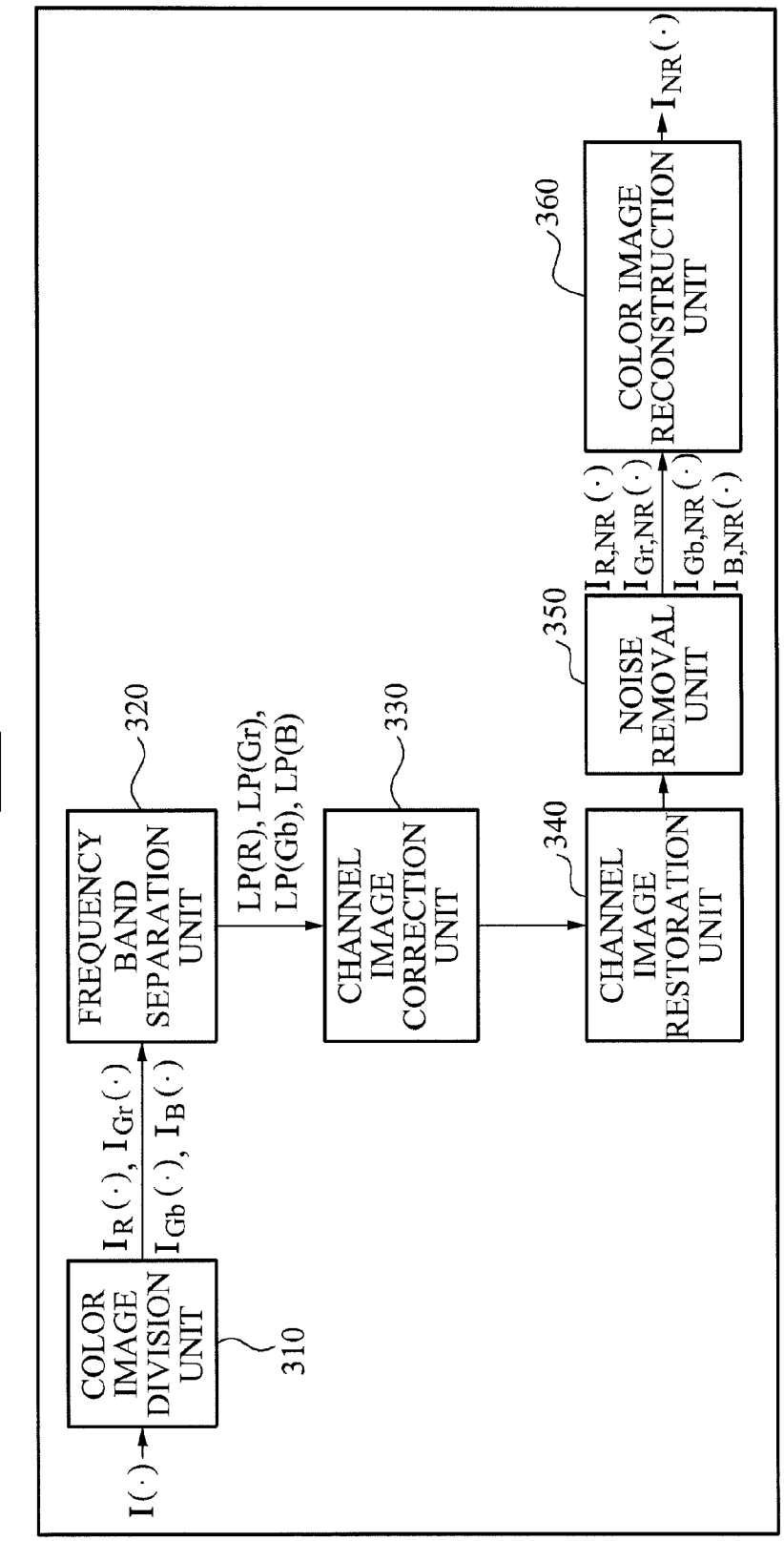
FIG. 3 is a diagram illustrating another example of an apparatus removing noise of an image according to example embodiments.

FIG. 3 is a diagram illustrating another example of an apparatus 300 removing noise of an image.

The apparatus 300 includes a color image division unit 310, a frequency band separation unit 320, a channel image correction unit 330, a channel image restoration unit 340, a noise removal unit 350, and a color image reconstruction unit 360.

The color image division unit 310 may divide an inputted color image into a plurality of channel images. The inputted color image may have noise, and the plurality of channel images may be channel images constituting the color image. For example, an RGB color image may be divided into a red (R) channel image, a green (G) channel image, and a blue (B) channel image. Alternatively, the RGB color image may be divided into a red (R) channel image, a reddish-green (Gr) channel image, a bluish-green (Gb) channel image, and a blue (B) channel image.

When the apparatus 300 is applied to a digital camera, an image obtained from a sensor may be a single piece of a color mosaic image obtained passing through a Bayer color filter array. The color mosaic image may be referred to as a Bayer sensor raw color image, that is, a Bayer image. The Bayer image may be divided into four color-channel images (hereinafter, referred to as 'channel image').

Figure 4:
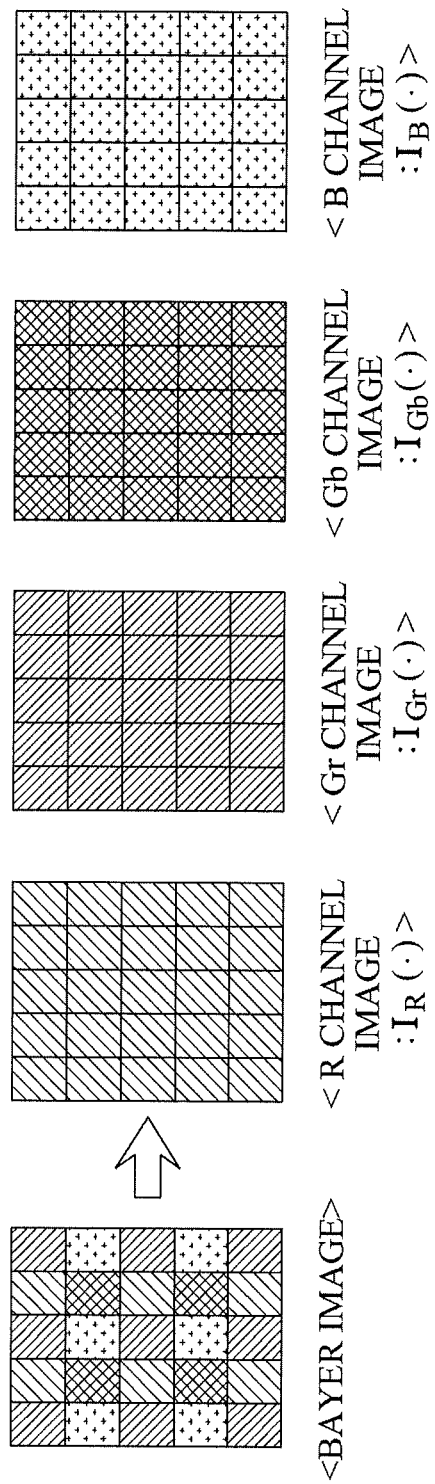
FIG. 4 is a diagram illustrating an example of a Bayer image and a channel image constituting the Bayer image.

FIG. 4 is a diagram illustrating an example of a Bayer image and a channel image constituting the Bayer image.

Four channel images may be an R channel image $I_R(\bullet)$, a Gr channel image $I_{Gr}(\bullet)$, a Gb channel image $I_{Gb}(\bullet)$, and a B channel image $I_B(\bullet)$. Each of the four color channel images $I_R(\bullet)$, $I_{Gr}(\bullet)$, and $I_B(\bullet)$ may be expressed as a sub-Bayer (SB) image.

The frequency band separation unit 320 may separate each of the channel images $I_R(\bullet)$, $I_{Gr}(\bullet)$, $I_{Gb}(\bullet)$ and $I_B(\bullet)$ into a low frequency band image and a high frequency band image to thereby generate Laplacian pyramids corresponding to the channel images.

Figure 5:
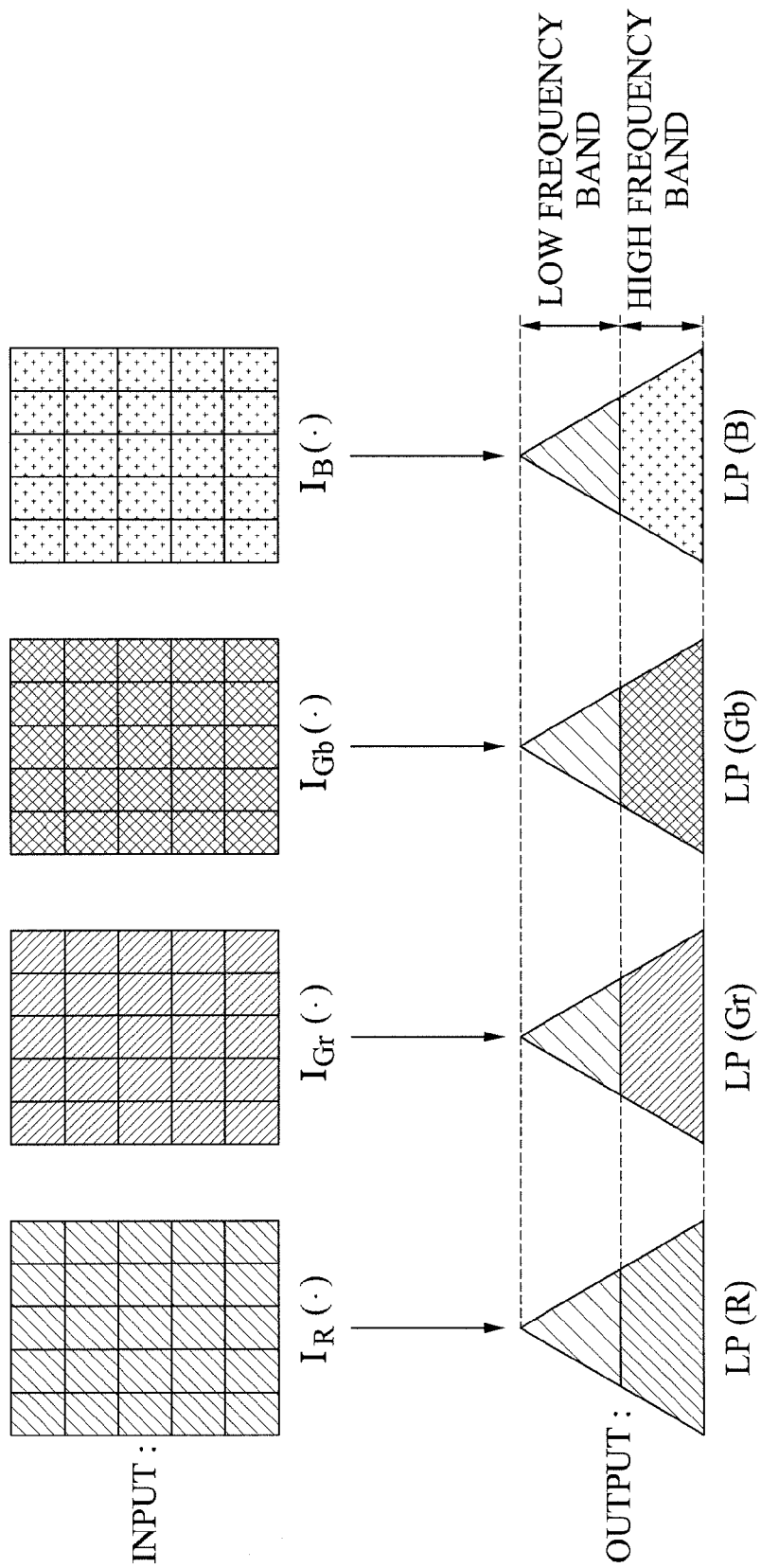
FIG. 5 is a diagram illustrating Laplacian pyramids corresponding to each channel image.

FIG. 5 is a diagram illustrating Laplacian pyramids corresponding to each channel image.

In FIG. 5, a low frequency band may be a relatively low band, and a high frequency band may be a relatively high band, both of which are classified by a predetermined standard. Accordingly, the low frequency band image may be an image having low frequency components, and the high frequency band image may be an image having high frequency components. The Laplacian Pyramids generated with respect to each of the channel images $I_R(\bullet)$, $I_{GR}(\bullet)$, $I_{Gb}(\bullet)$, and $I_B(\bullet)$ may be referred to as LP(R), LP(Gr), LP(Gb), and LP(B), respectively.

The frequency band separation unit 320 may generate the Laplacian pyramids having two layers as illustrated in FIG. 5, or may generate the Laplacian pyramids having at least three layers. In FIG. 5, for convenience of description, Laplacian pyramids having two layers are illustrated.

The channel image correction unit 330 may correct remaining channel images excluding a currently processed channel image from among a plurality of channel images, using the currently processed channel image.

Hereinafter, 'currently processed channel image' may be referred to as 'target channel image'. The target channel images may be $I_R(\bullet)$, $I_{Gr}(\bullet)$, $I_{Gb}(\bullet)$, and $I_B(\bullet)$, and may be sequentially processed, or simultaneously processed.

The channel image correction unit 330 may correct the remaining channel images by replacing images corresponding to a low frequency band of the remaining channel images by images corresponding to a low frequency band of the target channel images. Hereinafter, it is assumed that the target channel image is $I_R(\bullet)$ and the remaining channel images are $I_{Gr}(\bullet)$, $I_{Gb}(\bullet)$, and $I_B(\bullet)$.

In particular, the channel image correction unit 330 may correct pyramids of remaining channel images LP(Gr), LP(Gb), and LP(B) using a pyramid LP(R) of a target channel image from among Laplacian pyramids LP(R), LP(Gr), LP(Gb), and LP(B) outputted from the frequency band separation unit 320.

Specifically, since high frequency components excluding low frequency components have similar or identical characteristics between channel images, the channel image correction unit 330 may correct a low frequency band of the remaining Laplacian pyramids LP(Gr), LP(Gb), and LP(B) to thereby output the corrected Laplacian pyramids LP(Gr)', LP(Gb)', and LP(B)'. Specifically, the apparatus 300 may remove noise of the target channel image using high frequency components having similar or identical characteristics, and excluding the low frequency components having different characteristics from the remaining channel images. For example, images of a high frequency band may include noise.

Also, the channel image correction unit 330 may correct a part or all of low frequency bands from the Laplacian pyramid having at least two layers, and may include the lowest frequency band when correcting the part of the low frequency bands.

Figure 6:
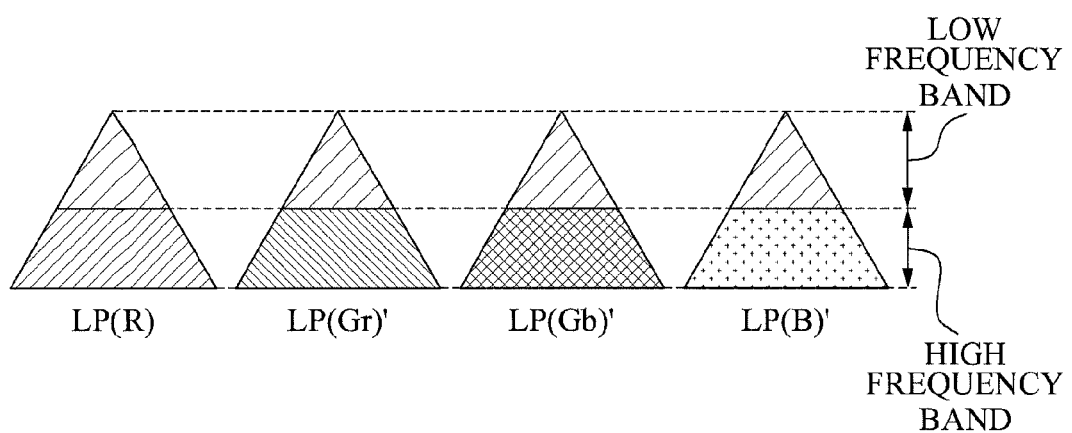
FIG. 6 is a diagram illustrating an example where a channel image correction unit corrects remaining channel images.

FIG. 6 is a diagram illustrating an example where a channel image correction unit corrects remaining channel images.

Referring to FIG. 6, the channel image correction unit 330 may correct the remaining channel images by replacing images corresponding to a low frequency band of the remaining channel images by images corresponding to a low frequency band of a target channel image.

Figure 7:
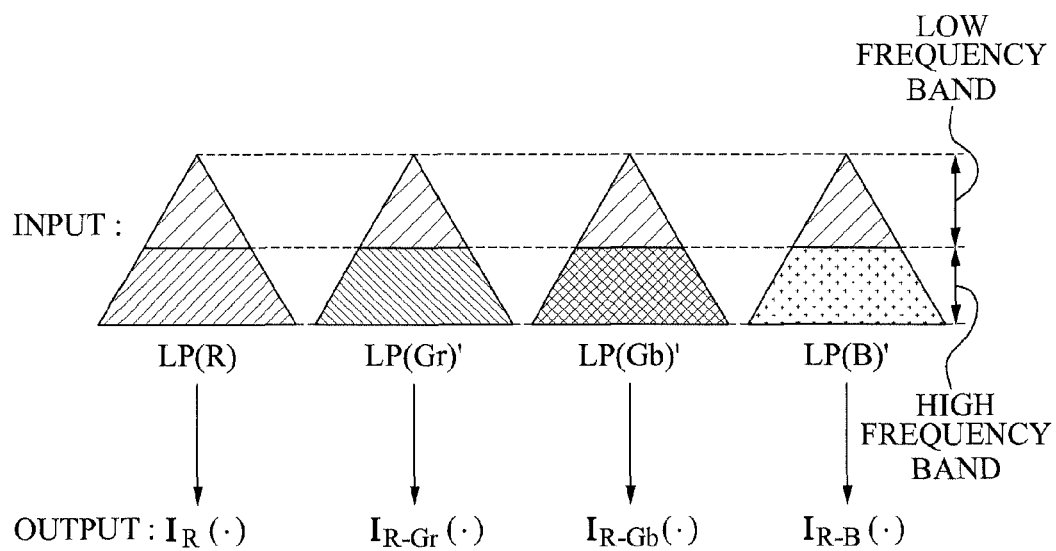
FIG. 7 is a diagram illustrating an example where a channel image restoration unit restores a target channel image and remaining channel images.

The channel image restoration unit 340 may restore, into channel images, corrected Laplacian pyramids LP(Gr)', LP(Gb)', and LP(B)' corresponding to the remaining channel images and the Laplacian pyramid LP(R) corresponding to the target channel image, as illustrated in FIG. 7.

The restored target channel image $I_R(\bullet)$ may be the same as the R channel image $I_R(\bullet)$ illustrated in FIG. 4, and the restored remaining channel images $I_{R\text{-}Gr}(\bullet)$, $I_{R\text{-}Gb}(\bullet)$, and $I_{R\text{-}B}(\bullet)$ may be different from the channel images illustrated in FIG. 4.

The restored remaining channel images $I_{R\text{-}Gr}(\bullet)$, $I_{R\text{-}Gb}(\bullet)$, and $I_{R\text{-}B}(\bullet)$ may be used as expanded channel images of the R channel image $I_R(\bullet)$. Specifically, the expanded channel images of the target channel image may include the corrected remaining channel images and the target channel image.

The apparatus 300 may perform the above described process on $I_{Gr}(\bullet)$, $I_{Gb}(\bullet)$, and $I_B(\bullet)$ to generate expanded channel images of each of the $I_{Gr}(\bullet)$, $I_{Gb}(\bullet)$, and $I_B(\bullet)$.

The noise removal unit 350 may remove noise of the target channel image using the corrected remaining channel images and the target channel image. Hereinafter, a method where the noise removal unit 350 removes noise from a target channel image using expanded channel images will be described.

The noise removal unit 350 may set, in the target channel image and the corrected remaining channel images, a search region where a pattern matching is performed, with respect to a current pixel in which noise is removed, and remove noise of the current pixel using a cumulative result of intensity where a weight is applied to neighboring pixels of the current pixel and a cumulative result of the weight.

The noise removal unit 350 may set a search window (SW) with respect to the current pixel (x) for each of four channel images, and respectively calculate a cumulative sum of intensity where a weight is applied to a neighboring pixel (y) within the SW, and a cumulative sum of the weight.

The noise removal unit 350 may respectively calculate the cumulative sum of the intensity and the cumulative sum of the weight, and determine an intensity value $I_{R,NR}(x)$ of a pixel in which noise is removed from the current pixel (x), using a finally cumulative sum of the intensity and a finally cumulative sum of the weight.

$I_{R,NR}(\bullet)$ may denote all target channel images, and $I_{R,NR}(x)$ may denote an intensity value of the current pixel (x) from among the target channel images.

Figure 8:
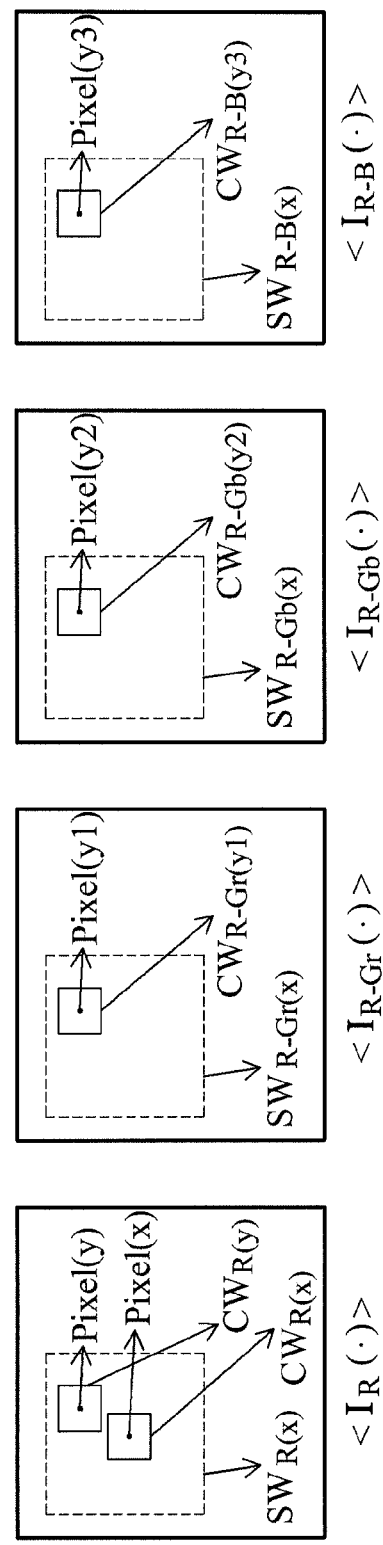
FIG. 8 is a diagram illustrating an example where a noise removal unit removes noise from a current pixel of currently processed R channel image according to example embodiments.

FIG. 8 is a diagram illustrating an example where a noise removal unit removes noise from a current pixel of currently processed R channel image.

Equation 1 below shows a method where the noise removal unit 350 removes noise of a target channel image using expanded channel images.

$$I_{R,NR}(x) = \frac{\sum_{y \in SW_R(x)} \omega_R(x, y) \cdot I_R(y) + I_R(y) +}{\sum_{y \in SW_{R-Gr}(x)} \omega_{R-Gr}(x, y1) \cdot I_{R-Gr}(y1) +} \\ \frac{\sum_{y \in SW_{R-Gb}(x)} \omega_{R-Gb}(x, y2) \cdot I_{R-Gb}(y2) +}{\sum_{y \in SW_{R-B}(x)} \omega_{R-B}(x, y3) \cdot I_{R-B}(y3)} \\ \frac{\sum_{y \in SW_R(x)} \omega_R(x, y) + \sum_{y \in SW_{R-Gr}(x)} \omega_{R-Gr}(x, y1) +}{\sum_{y \in SW_{R-Gb}(x)} \omega_{R-Gb}(x, y2) +} \\ \sum_{y \in SW_{R-B}(x)} \omega_{R-B}(x, y3)$$

[Equation 1]

wherein WR(x, y) denotes a comparison of region coherence between windows CWR (x) and CWR (y), WR-Gr (x, y1) denotes a comparison of region coherence between windows CWR (x) and CW R-Gr (y1), WR-Gb (x, y2) denotes a comparison of region coherence between windows CWR (x) and CW R-Gb (y2), and WR-B (x, y3) denotes a comparison of windows CWR (x) and CW R-B (y3).

The noise removal unit 350 may remove noise based on a weighted average in the corrected remaining channel images as well as a weighted average in the target channel image. Thus, the noise removal unit 350 may apply a pattern matching-based noise removal scheme (for example, a non-local mean (NLM) filtering scheme) to expanded channel images of the target channel image.

Referring to FIG. 8, the noise removal unit 350 may set a compare window CWR(x) with a predetermined size used for performing a pattern matching, with respect to a current pixel (x) from among target channel images (for example, IR(•)). The noise removal unit 350 may set search windows SWR(x), SWR-Gr(x), SWR-Gb(x), and SWR-B(x)) each having a predetermined size with respect to a position of the current pixel (x) of the target channel image, for each of four channel images IR(•), IR-Gr(•), IR-Gb(•), and IR-B(•) constituting an expanded channel of the target channel.

Also, the noise removal unit 350 may denote the compare window CWR(y), CWR-Gr(y1), CWR-Gb(y2), or CWR-B (y3) for pattern matching, for each of arbitrary pixels y, y1, y2, or y3 existing within the set search window.

The noise removal unit 350 may calculate a pattern coherence between CWR(x) in the current pixel (x) and CWR(y), CWR-Gr(y1), CWR-Gb(y2), and CWR-B(y3) in an arbitrary pixel y, y1, y2, or y3, and generate weights ωR(x,y), ωR-Gr (x,y1), ωR-Gb(x,y2), and ωR-B(x,y3) for a weighted average in the current pixel (x) based on the calculated pattern coherences. For example, the noise removal unit 350 may convert the respective pattern coherences to weights that monotone-increase based on the respective coherence. Specifically, the noise removal unit 350 may convert the respective pattern coherences to a weight approaching '1' along with an increase of the pattern coherence, and convert to a weight approaching '0' along with a reduction of the pattern coherence.

To calculate the pattern coherence between CWR(x) and CWR(y), between CWR(x) and CWR-Gr(y1), between CWR(x) and CWR-Gb(y2), and between CWR(x) and CWR-B(y3), the noise removal unit 350 may utilize a sum of absolute difference (SAD) scheme, a sum of squared difference (SSD) scheme, a normalized cross correlation scheme, and the like, as an image difference metric. Also, to regularize the calculated pattern coherence into a value between 0 and 1 and to convert the regularized value to the weight of the current pixel (x), the noise removal unit 350 may correct the pattern coherence based on the image difference metric and noise in the current pixel (x), and apply the corrected pattern coherence to an exponential function.

FIGS. 9A to 9D are diagrams illustrating an example where a noise removal unit removes noise of each channel image using expanded channel images.

Figure 9A:
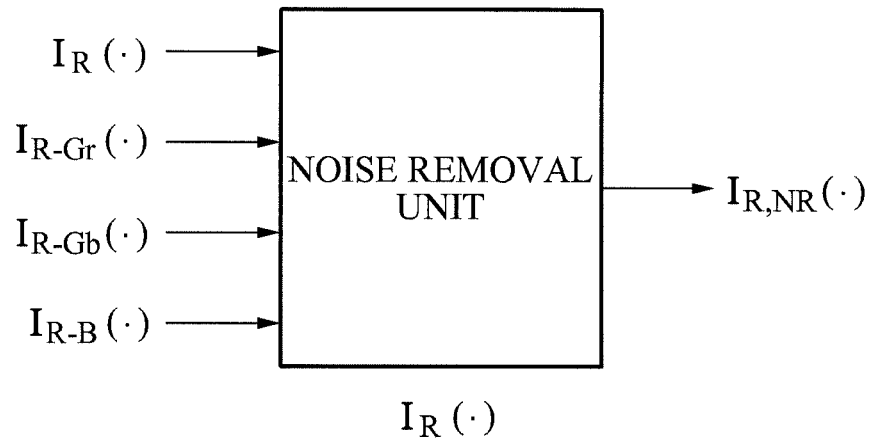
FIGS. 9A to 9D are diagrams illustrating an example where a noise removal unit removes noise of each channel image using expanded channel images according to example embodiments.

Referring to FIG. 9A, the noise removal unit 350 may remove noise of a target channel image IR(•) using expanded channel images IR(•), IR-Gr(•), IR-Gb(•) and IR-B(•) of an R channel image and using Equation 1. A target channel image IR,NR(•) having noise removed may be inputted to the color image reconstruction unit 360.

Figure 9B:
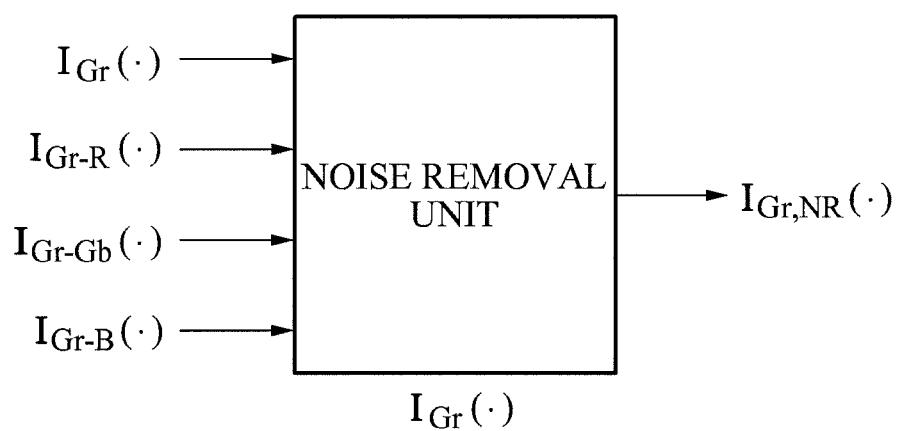

Referring to FIG. 9B, the noise removal unit 350 may remove noise of a target channel image IGr(•) using expanded channel images IGr(•) IGr-R(•), IGr-Gb(•), and IGr-B(•) of a Gr channel image and using Equation 1. A target channel image IGr,NR(•) having noise removed may be inputted to the color image reconstruction unit 360.

Figure 9C:
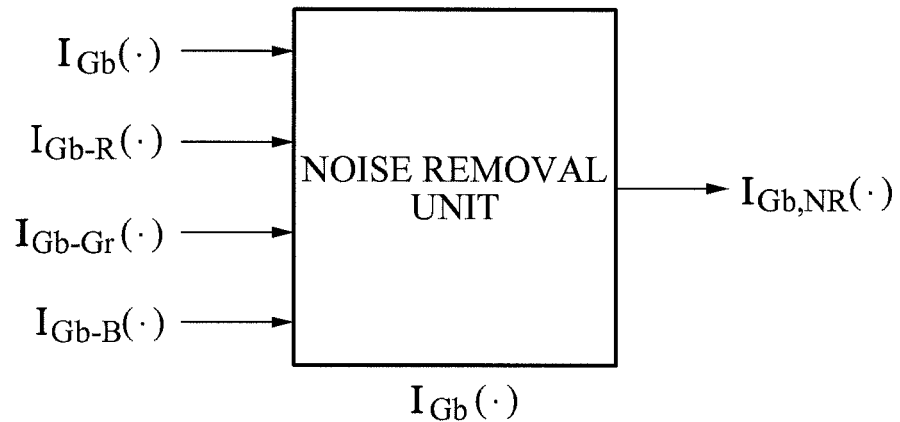

Referring to FIG. 9C, the noise removal unit 350 may remove noise of a target channel image IGb(•) using expanded channel images IGb(•), IGb-R(•) IGb-Gr(•), and IGb-B(•) of a Gb channel image and using Equation 1. A target channel image IGb,NR(•) having noise removed may be inputted to the color image reconstruction unit 360.

Figure 9D:
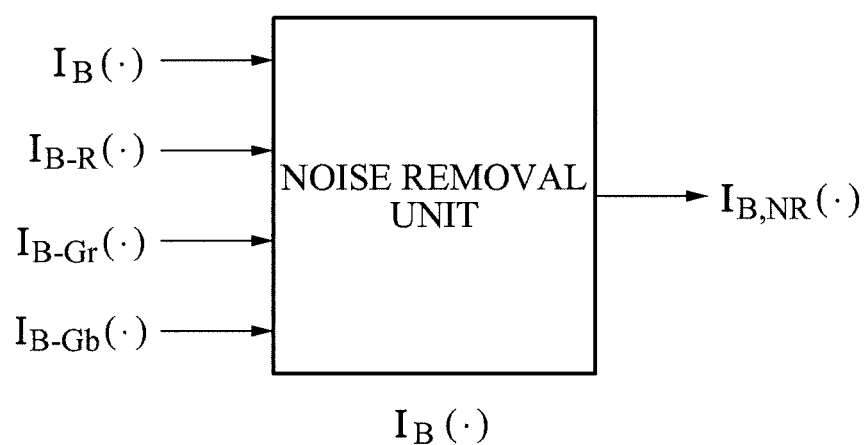

Referring to FIG. 9D, the noise removal unit 350 may remove noise of a target channel image IB(•) using expanded channel images IB(•), IB-R(•), IB-Gr(•), and IB-Gb(•) of a B channel image and using Equation 1. A target channel image IB,NR(•) having noise removed may be inputted to the color image reconstruction unit 360.

The color image reconstruction unit 360 may reconstruct a color image in which noise is removed by combining a plurality of channel images IR,NR(•), IGr,NR(•), IGb,NR(•), and IB,NR(•) in which noise is removed.

The reconstructed color image may be a Bayer image in which noise is removed.

Figure 10:
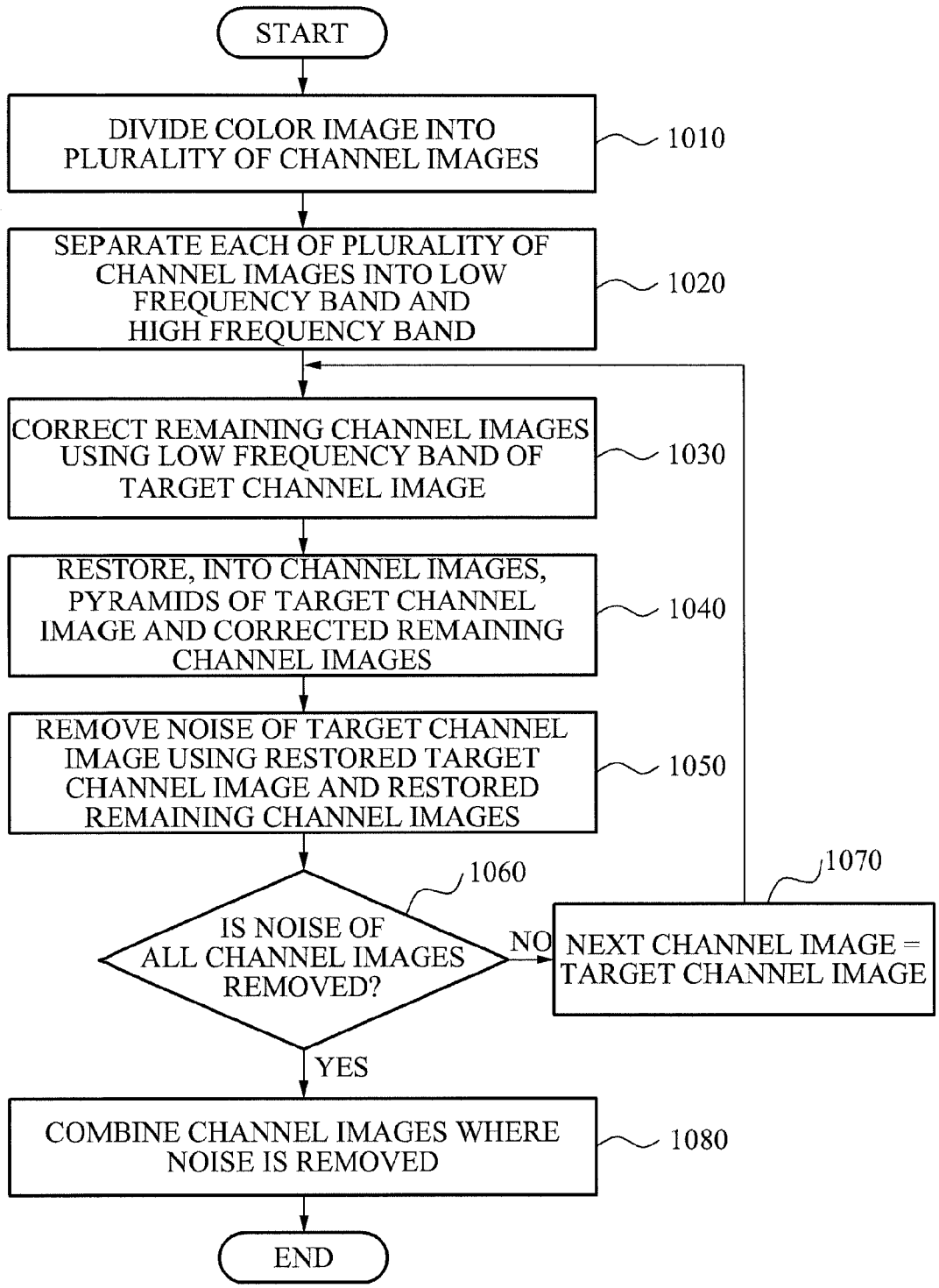
FIG. 10 is a flowchart illustrating another example of a method of removing noise of an image according to example embodiments.

FIG. 10 is a flowchart illustrating a method of removing noise of an image according to example embodiments.

In operation 1010, a color image may be divided into a plurality of channel images in the color image division unit 310. For example, the color image may be an RGB image, and channel images constituting the color image may be an R channel image, a Gr channel image, a Gb channel image, and a B channel image.

In operation 1020, the divided channel images may be separated into a low frequency band image and a high frequency band image in the frequency band separation unit 320 to generate a plurality of Laplacian pyramids corresponding to the plurality of channel images, as illustrated in FIG. 5.

In operation 1030, pyramids of remaining channel images LP(Gr), LP(Gb), and LP(B) may be corrected in the channel image correction unit 330 using a pyramid LP(R) of a target channel image from among the plurality of Laplacian pyramids, as illustrated in FIG. 6.

For example, in operation 1030, images of a low frequency band from among the remaining channel images may be corrected by being replaced with images of a low frequency band of the target channel image.

In operation 1040, the plurality of Laplacian pyramids of the corrected remaining channel images and the target channel image may be restored into a plurality of channel images in the channel image restoration unit 340, as illustrated in FIG. 7.

In operation 1050, noise of the restored target channel image may be removed by the scheme described with reference to FIGS. 8 and 9, using expanded channel images of the target channel image. The expanded channel images of the target channel image may include the target channel image and the remaining channel images restored after being corrected.

In operation 1060, it may be determined whether noise of all channel images is removed. In other words, it may be determined whether a currently processed image remains in the plurality of channel images obtained in operation 1010. In operation 1070, when the currently processed image remains, a next channel image (for example, IGr) to be processed may be set as the target channel image. Next, operations 1030 to 1050 may be repeatedly performed to remove noise of the target channel image IGr.

When it is determined that noise of all channel images divided in operation 1010 is removed in operation 1060, all channel images in which noise is removed may be combined to be reconstructed as a color image in the color image reconstruction unit 360.

As described above, the apparatuses 100 and 300 and method of removing noise of the image may correct remaining color channel images to remove noise of a currently processed channel image, so that noise may be removed from a color image having noise. Since high frequency components of the respective channel images have similar or identical characteristics, low frequency components of the respective channel images may be corrected based on low frequency components of the currently processed channel image and thus, the corrected remaining color channel images may be used together with the currently processed image when removing the noise from the color image.

Specifically, the apparatuses 100 and 300 and method of removing noise of the image may not perform a noise removal only using a single channel, and correct the remaining channel images using the target channel image based on coherence between color channels. Accordingly, an expanded channel for the target channel may be configured. In other words, the expanded channel i.e., multi-channel may be used for removing noise, thereby excellently removing noise of the target channel.

Also, the apparatuses 100 and 300 and method of removing noise of the image may be applied to various image digital media devices such as a digital camera, a camcorder, a mobile phone, a portable multimedia player (PMP) phone, and the like where an image sensor is mounted, various electronic equipment such as a personal computer, a television, and a set-top box, a vehicle where an image sensor automatically sensing an ambient environment is mounted, and the like.

In a case of the digital camera, the apparatuses 100 and 300 removing noise of the image may be implemented by an image signal processor (ISP) or a digital signal processor (DSP) restoring a high quality image from sensor images obtained through a sensor.

The above-described embodiments may be recorded in non-transitory computer-readable storage media including program instructions to implement various operations embodied by a computer. The media may include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An apparatus removing noise of an image, comprising:
   a color image division unit to divide an inputted color image into a plurality of channel images including a first channel image and a second channel image;
   a channel image correction unit to correct the second channel image using the first channel image;
   a noise removal unit to remove noise of the first channel image, using the corrected second channel image and the first channel image; and
   a color image reconstruction unit to reconstruct a color image in which noise is removed, based on the noise-removed first channel image and the corrected second channel image,
   wherein the first channel image is a current channel image to be processed, and
   wherein the channel image correction unit corrects the second channel images to replace an image corresponding to a low frequency band from among the second channel images with an image corresponding to a low frequency band from among the first channel images.

2. The apparatus of claim 1, further comprising:
   a frequency band separation unit to separate each of the plurality of channel images to a low frequency band image and a high frequency band image to generate a plurality of Laplacian pyramids corresponding to the plurality of channel images, wherein the channel image correction unit corrects low frequency bands of the plurality of Laplacian pyramids corresponding to the second channel images to output the corrected plurality of Laplacian pyramids.

3. The apparatus of claim 2, wherein the channel image correction unit corrects a part or all of the low frequency bands of the plurality of Laplacian pyramids.

4. The apparatus of claim 3, further comprising:
   a channel image restoration unit to restore, into the plurality of channel images, the corrected plurality of Laplacian pyramids corresponding to the second channel images.

5. The apparatus of claim 1, wherein the noise removal unit sets, in the first channel image and the corrected second channel images, a search region where a pattern matching is performed, with respect to a current pixel in which noise is removed, and removes the noise of the current pixel using a cumulative result of intensity where a weight is applied to neighboring pixels of the current pixel and a cumulative result of the weight.

6. The apparatus of claim 5, wherein the noise removal unit divides the cumulative result of the intensity into the cumulative result of the weight to remove the noise of the current pixel.

7. A method of removing noise of an image, comprising:
dividing, an inputted color image into a plurality of channel images including a first channel image and a second channel image;
correcting, by at least one processor, the second channel image using the first channel image;
removing, by the at least one processor, noise of the first channel image, using the corrected second channel images and the first channel image; and
reconstructing, by the at least one processor, a color image in which noise is removed, based on the noise-removed first channel image and the corrected second channel,
wherein the first channel image is a current channel image to be processed, and
wherein the correcting corrects the second channel images to replace an image corresponding to a low frequency band from among the second channel images with an image corresponding to a low frequency band from among the first channel images.

8. The method of claim 7, further comprising:
generating a plurality of Laplacian pyramids corresponding to the plurality of channel images by separating each of the plurality of channel images to a low frequency band image and a high frequency band image,
wherein the correcting corrects low frequency bands of the plurality of Laplacian pyramids corresponding to the second channel images to output the corrected plurality of Laplacian pyramids.

9. The method of claim 8, wherein the correcting corrects a part or all of the low frequency bands of the plurality of Laplacian pyramids.

10. The method of claim 9, further comprising:
restoring, into the plurality of channel images, the corrected plurality of Laplacian pyramids corresponding to the second channel images.

11. The method of claim 7, wherein the removing sets, in the first channel and the corrected second channel images, a search region where a pattern matching is performed, with respect to a current pixel in which noise is removed, and removes the noise of the current pixel using a cumulative result of intensity where a weight is applied to neighboring pixels of the current pixel and a cumulative result of the weight.

12. At least one non-transitory computer-readable medium comprising computer readable instructions that control at least one processor to implement a method, comprising:
dividing, an inputted color image into a plurality of channel images including a first channel image and a second channel image;
correcting the second channel image using the first channel image;
removing noise of the first channel image, using the corrected second channel image and the first channel image; and
reconstructing a color image in which noise is removed, based on the noise-removed first channel image and the corrected second channel image,
wherein the first channel image is a current channel image to be processed, and
wherein the correcting corrects the second channel images to replace an image corresponding to a low frequency band from among the second channel images with an image corresponding to a low frequency band from among the first channel images.

* * * * *